Nov. 15, 1960 R. DE GAILLARD 2,960,686

METHOD OF AND DEVICE FOR RECORDING AND REPRODUCING ON MAGNETIC CARRIERS AT ANY SPEED

Filed Oct. 5, 1956

Inventor

R. de Gaillard

By Glascock Downing & Seebold

Attys.

2,960,686

METHOD OF AND DEVICE FOR RECORDING AND REPRODUCING ON MAGNETIC CARRIERS AT ANY SPEED

Robert de Gaillard, 12 Rue Marbeuf, Paris, France

Filed Oct. 5, 1956, Ser. No. 614,228

Claims priority, application France Oct. 17, 1955

2 Claims. (Cl. 340—174.1)

Figure 2:
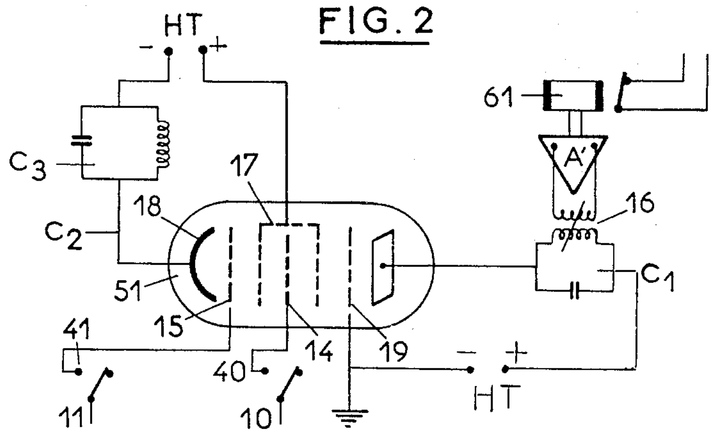

The invention relates to methods of and devices for recording and reproducing frequencies recorded on a magnetic carrier, especially for application to remote control or to telecommunications.

An object of the invention is to free these methods and devices from the limitations which have hitherto been regarded as unavoidable and by virtue of which the speed of reproduction has to be equal to, or at a constant ratio with, the speed of recording.

Another object of the invention is to free oneself of the obligation to use constant and continuous speeds both for the recording and the reception. It is in this connection and in contradistinction that the expression "any speeds" will hereinafter be used, that is to say speeds which are neither necessarily constant nor necessarily continuous.

With these objects in view, the idea of the invention lies in the fact that, while recording oscillatory phenomena magnetically, instead of using their frequency, which is a time parameter, the density of recording, which is a space parameter, i.e. the number of oscillations recorded per unit of recording length on the magnetic carrier, is used. This density may be linear or angular, according to whether it is measured along a rectilinear or a circular trajectory.

The invention itself consists in (1) Preliminarily recording separately at a constant speed on a magnetic carrier, oscillations of constant frequencies (2) For the recording per se, giving the carrier, herein called preliminary carrier, any speed, called recording speed, detecting selectively in accordance with a predetermined code the oscillations preliminarily recorded on the said preliminary carrier and recording these oscillations on a second carrier called recording carrier, at a speed which is equal to or synchronised with the recordnig speed;

(3) For the reproduction, on the one hand, giving the said recording carrier any speed, called reproducing speed, which is not necessarily equal to the recording speed and detecting the oscillations recorded on the said recording carrier, and, on the other hand, giving a magnetic carrier, which is identical with and identically recorded as the said preliminary carrier a speed which is equal to the algebraic sum of the reproducing speed and an arbitrarily chosen constant speed, called speed of reference, detecting the oscillations recorded on the said carrier identical with the preliminary carrier and then sending the oscillations respectively, detected on the two carriers, to a mixing valve which is tuned to the frequency which would be detected on the preliminary carrier if the latter were moved at the speed of reference.

The speeds with which the present description is concerned may be understood as being relative speeds, the frequencies may be understood as being combinations of frequencies and the oscillations may be understood as being combinations of oscillations.

The preliminary step of recording should be regarded as entirely known and as not, itself, forming part of the invention.

Examples of such low-frequency generators will be found in, among others, the specification of my patent application Ser. No. 508,277 of 1955, now abandoned.

For carrying out the invention, regard will therefore be had to the fact that magnetic carriers are available, for example magnetic discs, on which various frequencies have already been recorded at a constant speed and along closed circular tracks, that are parallel to one another, at the rate of one frequency per track.

There will hereinafter be given an example of carrying out the two last steps which constitute the novel part of the invention, it being understood that the generic portion of the invention is not limited to or by the features that are specific to the example chosen by way of illustration.

Figure 1:
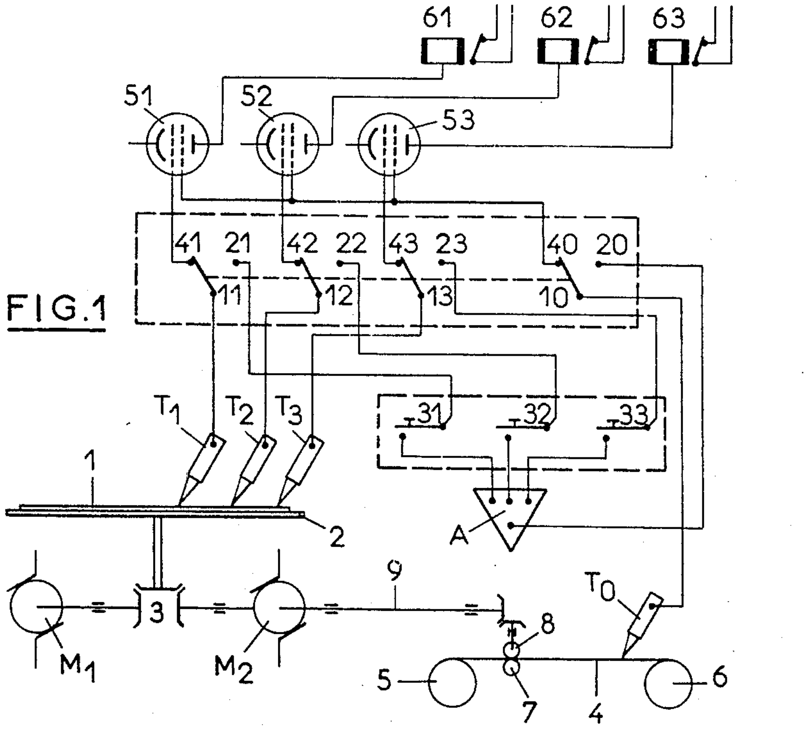

In the accompanying drawings,

Fig. 1 represents, diagrammatically, a device according to the invention which is adapted to be used both for recording and reproducing; and Fig. 2 gives an example of connection of a mixing valve, this connection being previously known and of the present day art and, therefore, being outside the present invention.

In the example chosen, it was proposed to solve the problem of recording on and reproducing from a magnetic carrier which is intended for the electromagnetic control of any receiving apparatus, on which no other hypothesis has been made, by means of periodic oscillatory signals recorded on the said carrier.

The recording and reproducing stations are here identical, but it is advisable not to lose sight of the fact that the chief object of the invention is the application to separate and independent stations which may, respectively, be manifold.

For the sake of convenience of expanation, the number of frequencies has been limited to three, which may be used individually or in combination, but the invention has been specially devised for the use of a large number of frequencies.

In Fig. 1, 1 denotes a magnetic disc on which three frequencies $F_1$, $F_2$ and $F_3$ have been preliminarily recorded at a constant speed VP, for example by the method described in the specification of my application Ser. No. 508,277 of 1955 hereinbefore mentioned, and respectively along three circular tracks. It will be observed that this disc in not necessarily the same for the two recording and reproducing stations, if the latter are separate. It is sufficient that identical recordings should have been made on the two discs. These three frequencies will preferably be multiples of three prime numbers.

The disc 1 resets on a turntable 2 which is rotated through the intermediary of a differential, represented diagrammatically at 3, which is driven by the two motors $M_1$ and $M_2$.

The motor $M_1$ is a constant-speed electric motor, that is to say a motor working at the speed called speed of reference. In the present-day art, there are many different means for controlling the speed of an electric motor and keeping it within two limits. Merely by way of example, there may be mentioned the method described in the specification of my application Ser. No. 399,352 of 1953, now abandoned.

The motor $M_2$, which is represented diagrammatically as an electric motor, is, on the contrary, a motor essentially of any speed; this point will be returned to hereinafter.

$T_1$, $T_2$ and $T_3$ denote pick-up heads corresponding to the three recorded tracks of the disc 1. These heads are of the present-day art and will not be described herein.

4 denotes the magnetic carrier, such as a metallic wire or tape, intended for the electromagnetic control of the receiving apparatus. 5 and 6 represent the storage coils of the carrier 4, while 7 and 8 represent two rollers which are intended for driving the carrier 4. The movement transmission gear, which is represented diagrammatically at 9, ensures the driving of the rollers by the motor $M_2$. $T_0$ denotes a recording and pick-up head of the present-day art. The heads $T_1$, $T_2$ and $T_3$ are connected to switches 11, 12 and 13, respectively, which switches are mechanically ganged for movement in unison, and which electrically connect the heads $T_1$, $T_2$ and $T_3$:

When they are in the reproducing position on the contacts 41, 42 and 43, with one of the grids of the mixing valves 51, 52 and 53.

When they are in the recording position on the contacts 21, 22 and 23, to the amplifier A through the keys 31, 32 and 33.

The switch 10, which is integral in movement with the switches 11, 12 and 13, connects the head $T_0$.

When it is in the reproducing position on the contact 40, to the second grid of the mixing valves 31, 32 and 33.

When it is in the recording position on the contact 20.

The plate circuits of these valves are respectively tuned to the frequencies which would be picked up on the carrier 1 if it were moved at a constant speed by the motor $M_1$. Let us call these frequencies $K'F_1$, $K'F_2$ and $K'F_3$, $K'$ being a coefficient which takes into account the fact that the instantaneous speed of $M_1$ is not necessarily equal to VP.

In the plate circuit of the said valves are the relays 61, 62 and 63, by means of which it is possible to control any receiving apparatus electro-mechanically.

Although the frequency-mixing valves are of the present day art, one of the possible standard connections has been shown in Fig. 2.

The switches 10 and 11, the valves 51 and the relay 61 of Fig. 1 are to be seen in Fig. 2. The two grids 14 and 15 are shown connected respectively to the contacts 40 and 41 of two switches. In the plate circuit there is shown the tuning circuit $C_1$, containing as usual, a condenser and an impedance, and, here, the transformer 16, in the secondary winding of which there is a rectifying amplifier A' and the relay 61. The anode circuit $C_2$, which is connected to a source of high voltage HT, contains, as usual, a tuning circuit $C_3$ and the two electrostatic screen grids 17 and 18. There is also shown the usual screen grid 19 which is grounded. This connection is given as entirely known and, in carrying out the invention, may be replaced by any equivalent connection.

Returning to Fig. 1, the keys 31, 32 and 33 have been represented symbolically like telegraphic keys. In reality, they will be controlled by a keyboard, each key of which corresponds to a key or to a definite combination of a plurality of keys.

The operation is as follows:

On recording on carrier 4, the switches 10 to 13 being on the contacts 20 to 23, the motor $M_1$ is stopped; on depressing one of the keys, for example 31, there will be recorded, on the carrier 4, the oscillatory signals picked up by the head $T_1$ on the track of the carrier 1, on which the frequency $F_1$ has been previously recorded. In order to enable the invention to be well understood, it should be pointed out that, owing to the synchronism of the speeds of the two carriers and if it is assumed that, subsequently, the recording on the carrier 4 is reproduced at a constant speed, there would be obtained, on reproduction, a constant frequency $F_1$ which is substantially independent of the variation which the speed of $M_2$ may have undergone during the recording.

In choosing the transmission ratio, it can be assumed that the density recorded on the carrier 4 is equal to the density recorded on the carrier 1.

On reproducing, the motors $M_1$ and $M_2$ rotate. The turntable 2 is thus rotated, by the action of the differential, at a speed which is proportional to the algebraic sum of the speeds of $M_1$ and $M_2$, while the carrier 4 is moved at a speed which is proportional to the speed of $M_2$.

Let us assume that, at the instant considered, the track of the carrier 4, which is passing beneath the head $T_0$, gives the reproduction a frequency $KF_1$, K being a coefficient which takes into account the fact that the instantaneous speed of $M_2$ is not necessarily equal to VP. It is seen that the mixing valves will transmit, in their plate circuits, among others, the frequency:

$$(KF_1+K'F_1)-KF_1$$

that is to say $K'F_1$, $K'F_1$ being, as it were, the frequency which would be picked up on the carrier 1, if this carrier were moved by the motor $M_1$ alone.

Since the plate circuit of the valve 51 is tuned to $K'F_1$, the relay 61 will be energized, while the other relays will remain inoperative. The relay 61 would remain inoperative if $KF_1$ were not on the same track of the carrier 4, whether $KF_1$ is not on the track or whether the head $T_0$ is picking up there $KF_2$ or $KF_3$.

It is important, for understanding the invention to have regard to the fact that it makes absolutely no hypothesis concerning the nature of the motor $M_2$.

Let us assume, for example, that the magnetic carrier 4 of, short length is put on an account slip which is placed in a sorting case and that, according to the technique disclosed in the specification of my application Ser. No. 558,358 of 1956, the case is arranged so that, on withdrawing the slip from the case, the carrier 4 passes between the rollers 7 and 8 and beneath the head $T_0$. The transmission gear 9 then transmits the movement, imposed on the rollers by the movement of the slip, directly to the differential 3. The motor, $M_2$ will then have been replaced by the pull exerted manually on the slip, this pull being exerted at a discontinuous and generally variable speed.

In the way, the motor $M_2$ could be replaced by, for example a transmission which causes the movement of the transmission gear 9 to depend upon the movements of the wheels of a locomotive or of an automobile, the travel of which would be controlled by orders picked up by the head $T_0$ on the carrier 4.

It is also pointed out that the motor $M_2$ is not necessarily the same unit at the recording station and at the reproducing station. As regards the disc 1, it may not be the same; it is sufficient to have available, at the different recording and reproducing stations, discs bearing identical recordings which have been identically recorded.

What I claim is:

1. A recording and reproducing system comprising, in combination, a first magnetic carrier, on which are recorded diverse constant frequency signals respectively, on discrete tracks, means for detecting at any speed the discrete signals recorded on said first carrier, and means for simultaneously recording the detected signals on a second magnetic carrier at a speed synchronized with the speed of the first carrier, means for simultaneously detecting the signals recorded on the second carrier at any reproducing speed and the signals recorded on the first carrier at a speed equivalent to the algebraic sum of said reproducing speed and an arbitrary constant speed of reference, means for mixing the simultaneously detected signals and means to develop a control signal, responsive to said resultant mixed signal, having a frequency equal to that which would be detected from the first magnetic carrier when driven at the constant speed of reference.

2. In a transmission system by means of a magnetic recording medium, a coding and recording apparatus comprising a magnetic carrier on which constant code character frequencies corresponding to a code have been recorded at a constant speed on separate tracks, means for detecting these frequencies, means for carrying out this detection selectively in accordance with the data to be coded and recorded, a second magnetic carrier, means for moving the two carriers simultaneously at a fixed speed ratio, means for recording sequentially on a continuous track of the second carrier said code character frequencies selectively, a reproducing apparatus comprising said second carrier, a reference carrier on which the same code character frequencies as on the said first carrier have been recorded at constant speed on respective separate tracks, means for giving said second carrier a speed which is equal to the algebraic sum of a constant speed, called the speed of reference, and of any speed, called the reproducing speed, means for simultaneously detecting the frequencies reproduced on the said reference carrier, means for moving said second carrier at a speed which is at a constant ratio to said reproducing speed, and mixing valves corresponding in number to the number of the code character frequencies, each valve receiving on a grid the frequencies detected on the reference carrier and on another grid the frequency detected on the second carrier, the said valves being respectively tuned to frequencies which would be detected on the reference carrier if it were moved at the speed called the speed of reference.

References Cited in the file of this patent

UNITED STATES PATENTS

| | | |
|---|---|---|
| 2,275,609 | Bryce | Mar. 10, 1942 |
| 2,352,023 | Schuller | June 20, 1944 |
| 2,509,215 | Craig et al. | May 30, 1950 |
| 2,532,803 | Faus | Dec. 5, 1950 |
| 2,622,155 | Dutton | Dec. 16, 1952 |
| 2,690,473 | Cooley | Sept. 28, 1954 |
| 2,843,446 | Pettus et al. | July 15, 1958 |